Patented Apr. 30, 1946

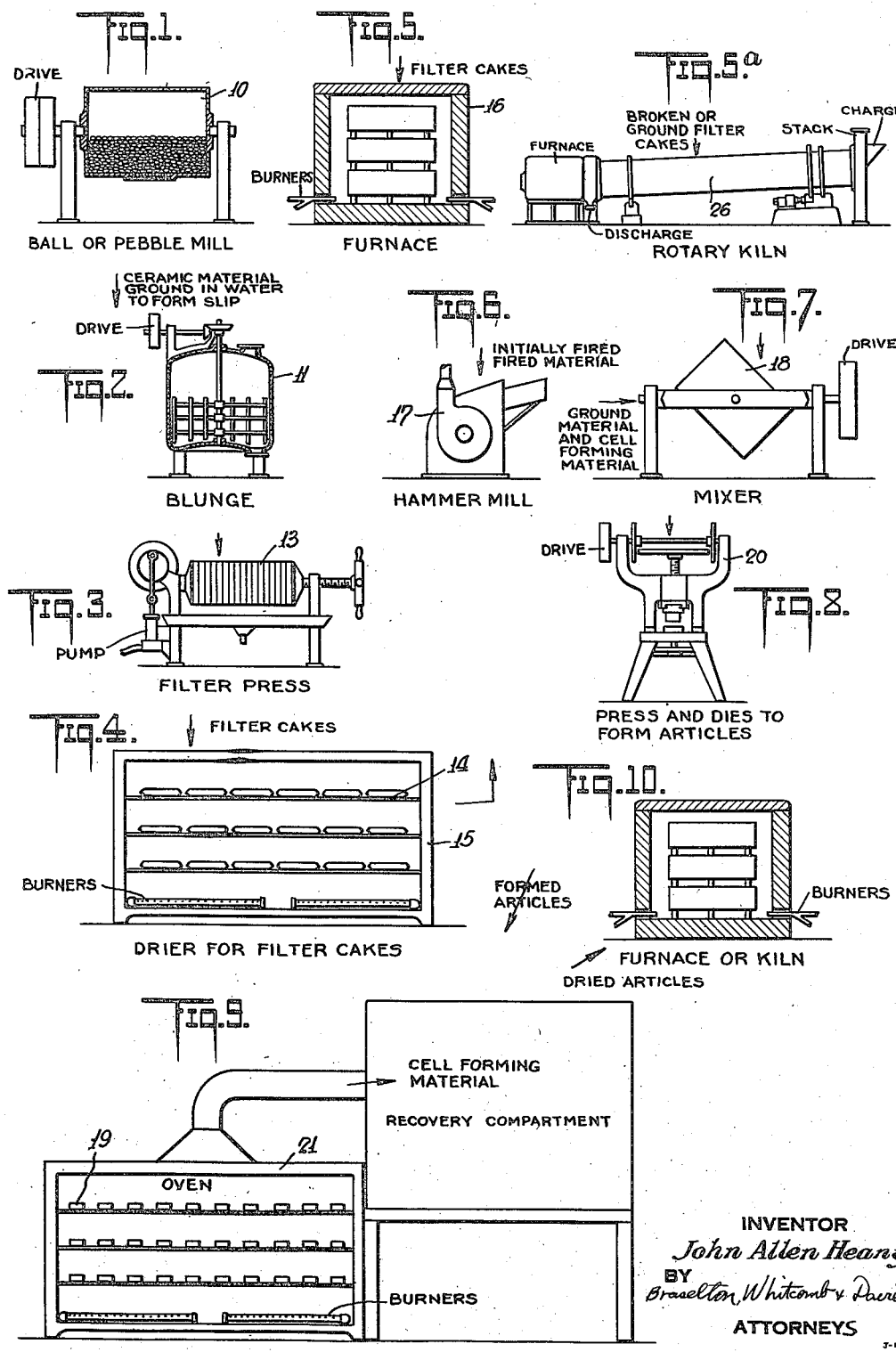

2,399,225

UNITED STATES PATENT OFFICE 2,399,225

VITREOUS CELLULAR MATERIALS

John Allen Heany, New Haven, Conn.

Application February 16, 1939, Serial No. 256,664

13 Claims. (Cl. 106—40)

This invention relates to vitreous cellular materials, and particularly to methods of producing the same.

The present invention will be illustratively described in connection with the production of cellular, vitreous or vitric-like amorphous magnesia ceramics, although it is to be understood that the invention is also applicable to making vitreous ceramics from other ceramic oxides or materials such as alumina and bauxite.

Considerable difficulty has been experienced in forming ceramics of magnesia, bauxite or alumina, since it has been necessary to fuse these materials. This fusion will result in the production of a non-amorphous, crystalline product, and requires the utilization of expensive electric furnace equipment. Moreover, it is generally necessary to include substantial quantities of bonding or fluxing agents, which not only introduce impurities into the final ceramic and decrease its refractory and other desirable qualities, but which in addition frequently result in the production of porous articles of non-vitreous character, and which are not of a refractory nature.

It is, therefore, among the objects of the present invention to produce vitreous, amorphous ceramic articles, such as refractories, bricks, and so forth, from magnesia, bauxite or alumina in hydrated or unhydrated condition, by ceramic forming and firing processes, without resorting to expensive fusions in electric furnaces and without utilizing fluxing or bonding agents.

However, in producing these vitreous and amorphous ceramics, preferably from magnesia but also from alumina or bauxite, it has been found that the final ceramics are not only quite heavy, involving expensive transportation and shipping charges, but also are quite difficult to handle, particularly from the viewpoint of cutting or chipping the article to desired size or shape or making alterations in the form thereof after the final product has been formed and fired. Moreover, these materials do not readily accommodate themselves to varying temperatures and often they tend to break or rupture when subjected to wide temperature variations.

It is therefore among the further objects of the present invention to provide a relatively lightweight, yet rigid, vitreous and amorphous ceramic material which may be readily cut, chipped or otherwise divided or altered in shape or form for the desired function, and which may readily expand or contract with varying temperatures without cracking or rupturing.

Other and further objects and advantages will also appear from the more detailed description given below, it being understood, however, that this more detailed description is given by way of illustration and explanation only and not by way of limitation, since various changes therein may be made by those skilled in the art without departing from the scope and spirit of the present invention.

In accomplishing the above objects it has been found most satisfactory to grind the magnesia, and also the alumina or bauxite, in dehydrated, amorphous condition or cause subdivision of it, with or without the presence of vitrifying catalysts, so that a change in the ceramic reactivity of the product takes place.

This is most readily accomplished by wet grinding the material with small amounts, say less than 20% of vitrifying catalysts, of the nature of silica, borates, or alkali or alkaline earth metal salts, until the major portion, say 50% to 80%, of the material has a size substantially less than 50 microns and desirably in the range from 5 to 30 microns.

This finely divided material, with or without drying, is then incorporated with particles or small pieces of a preferably vaporizable substance which will be inert toward the ceramic material, and the combination is shaped and formed by pugging, molding extrusion or in other manners to cause a thorough mixture or combination of the particles of the combustible or volatilizable material with the ceramic material, whether it be magnesia, alumina or bauxite.

The shaped and formed article then may be treated to dehydrate it, if it is not already free of water, and to cause volatilization or vaporization of the combustible or volatilizable material therein, preferably at a relatively low temperature insufficient to cause melting or reaction between the ceramic material and the combustible or volatilizable material which may be called the cell-forming material. This temperature may vary from 70° C. to 800° C.

The product so formed may then be fired at a temperature ranging from 1000° C. to 1600° C., and preferably at a temperature ranging from 1250° C. to 1500° C.

The resultant product will be of low specific gravity and yet be vitreous and rigid. Depending upon the particular proportionment between the combustible or volatilizable material and the ceramic material, the cells of the cellular structure may be caused to form from 20% to 90%, and preferably from 50% to 85%, of the total volume of the ceramic material or article that is formed.

Instead of the method above specifically described, it is also possible to take the ceramic material, for example the magnesia, after grinding to colloidal condition, with or without a vitrifying catalyst, and then to form and/or fire an initial vitreous product. This fired vitreous product may then be broken up and ground, either dry or wet, and then combined with volatilizable or combustible material. Then the product is subjected to a heat treatment sufficient to cause the volatilization or combustion of the particular volatilizable or combustible material used, followed by a firing operation at a temperature of from 1000° C. to 1600° C. to form the final cellular structure.

The magnesia is preferably derived in powdered, pulverized or finely divided condition by the calcining of relatively pure magnesia ores, such as magnesite, this calcining being carried out at such a temperature and for such a time period so as to maintain the magnesia in amorphous condition and to render the dehydrated magnesia more susceptible to the grinding, forming and firing procedures. The powdered or finely divided magnesia may then as such be ground with water, preferably in a ball or tube mill.

However, it is generally desirable to mix the magnesia with the proper percentages of vitrifying catalysts, if any are to be used, before the grinding operation, although these materials may, in some cases, be added after the grinding operations, or in part before and in part after the grinding operations. The grinding not only assures hydration and colloidization of the magnesia and catalysts, but also causes a more thorough dispersion thereof.

The vitrifying catalysts which may be utilized with magnesia are small amounts of silica or other acid oxides such as titanium dioxide and zirconium oxide, desirably less than 5%, and preferably about 2% or 3%.

Combinations of these vitrifying catalysts may be employed, but in no case should the percentage of vitrifying catalyst acid exceed 10%. In all cases fluxing or bonding agents should be omitted from the material, and the vitrifying catalysts should at all times have melting points higher than the firing temperature so as not to melt during the process.

Generally, at the conclusion of the wet grinding or colloidizing, the magnesia will have become partly hydrated, the magnesia taking up about 3% to 7% additional water. The grinding operation, if desired, may take place in two steps, the crushed material first being subjected to grinding in a hammer mill and in dry condition, and then being subjected to wet grinding in a ball or pebble mill, this latter operation preferably being performed for several hours and with an amount of water varying from one to five times the amount of solids being ground.

In any case, the grinding should be continued so that a major proportion, say 50% to 80%, of the material is reduced to a fineness smaller than 50 microns, and preferably finer than 20 microns. In the preferred procedure, at least 91% of the material is finer than about 12 microns, and the majority of the particles range from 0.8 to 9.0 microns in size. It is desirable to obtain a relatively uniform particle size in the final mixture. Preferably about 25% to 75% or more of the magnesia is converted into a hydrated or hydroxide form.

When the material has been ground to this fineness in water, it is found that the magnesia has been converted into a substantially colloidal condition, or has been mechanically hydrated so that the particles are more readily suspended in water and do not very readily settle.

As a typical mixture which is produced as a result of this grinding process, the following may be given:

| Particle size in microns | Percent of particles finer |
|---|---|
| 35 | 95 |
| 21 | 94 |
| 16 | 93 |
| 11 | 92 |
| 9 | 91 |
| 6.5 | 91 |
| 4.5 | 88 |
| 3.3 | 81 |
| 2.7 | 74 |
| 2.2 | 64 |
| 1.9 | 57 |
| 1.1 | 36 |
| 0.8 | 24 |

Specific gravity, 3.50.

Magnesia materials of these particle sizes, particularly in the presence of vitrifying catalysts containing acid oxides, appear to be able to vitrify or be converted into ceramic materials at very low temperatures, substantially below the melting point of magnesia.

In wet grinding or colloidizing the magnesia, it is generally desirable to use a flint-lined pebble mill with flint pebbles, and the grinding should be carried out under such conditions that the magnesia will not take up more than about ¼% to ¾% of silica from the mill. It is generally desirable to use 25% of the magnesia composition and 75% water to make the grinding slip. The time of grinding is dependent upon the size of the pebble mill, the size of the pebbles, the quantity used and the speed of the mill. With a small mill, one gallon size, good results are obtained with fifty hours grinding, the weight of the charge being one kilogram of magnesia composition and three kilograms of water, and the mill being about one-half full of pebbles of approximately ¾" diameter. The larger the mill, the less grinding time required, due to the greater action of the pebbles. The time of grinding, however, may be varied from ten to sixty hours, and the amount of water from 35% to 85% of the mix in the pebble mill.

The material, after grinding, may be dried directly, but is preferably partly dehydrated by filter pressing. The filter cake which is formed should preferably not contain more than about 20% to 30% of water, and it may be dried at a temperature not substantially exceeding about 200° C. and at the most not exceeding 500° C. to 600° C., to substantially remove the water content from the filter cake.

This filter cake, which after drying is relatively shrunken and dense, may be moistened or dampened, if desired, to break it up into a large number of small blocks or particles which may then be directly fired between 1200° C. and 1600° C., or preferably between 1450° C. and 1500° C., to produce granules of a dense, amorphous, vitreous or vitric-like ceramic.

The combustible or volatilizable material which is to be combined with the colloidized ceramic oxide is separately prepared. This combustible material, as will subsequently be described, may be combined directly with the filter cake containing its original quantity of moisture or with its reduced quantity of moisture, or it may be combined with the dry or wet powder produced by grinding the granules resulting from the initial firing operation.

The preferred volatilizable material is a crystalline, workable, plastic, organic compound, such as naphthalene, which will not leave any residue and which will not tend to combine with material forming the base of the ceramic. Although naphthalene is preferred, it is possible also to utilize other volatilizable high molecular weight compounds, particularly of an aromatic nature, such as anthracene, camphor, phthalic anhydride. The preferred materials are pure compounds which will volatilize or burn without residue. Materials such as waxes, asphalts, wood fibers, cork, coal and so forth, are not so satisfactory, since they tend to melt before volatilization and/or cause trapping of gases and deformation of the cellular structure. Moreover, substances which produce large volumes of gases, such as the peroxides or carbonates, are also unsatisfactory since the cells that result are not uniform in size or distribution.

In preparing the preferred volatile material, for example, naphthalene, for combination with the wet or dry colloidized ceramic material, such as magnesia, it is desirable to form the particles in spheroidal form. Although other shapes and forms of naphthalene may be used, such as the original scale or plate-like crystals, the spherical form lends itself most readily to the production of a rigid ceramic structure in the final product. The desired shape of naphthalene particles may be conveniently obtained by melting the naphthalene and dropping it in a closed chamber from a high point so that it will solidify while dropping.

By controlling the procedure, it is possible to vary the size of the naphthalene particles from ⅛" in diameter to 200 mesh. To maintain the particles and assure their ready inter-mixture with the ceramic oxide, it has often been found desirable, coincidental with the manufacture of these products, to dust them or cause a formation upon them of a thin adherent coating of a dust of the ceramic oxide or material which is to be subsequently converted into vitreous, cellular condition, or even to apply a dust or surfacing of a vitrifying catalytic material, which then may be omitted from the composition of the colloidized ceramic material.

It is sufficient, usually, in the case of naphthalene, to dust the particles with between 1% to 3% by volume of dry pulverulent magnesia. This dusting will eliminate any tendency toward adhesion between the balls of naphthalene prior to their being combined with the colloidized magnesia.

The colloidized magnesia, in the form of the wet or partly dried filter cake or in the form of the wet or dry ground vitreous particles, is then mixed with the naphthalene particles in the desired proportions to give a predetermined cellular structure. The proportion of naphthalene to magnesia may vary considerably from 10% to 95% of the final combination with an optimum of between 25% to 50% by weight of the magnesia or from 20% to 60% by volume of the naphthalene.

The mixture may be obtained in a tumbling mill where the dry and vitrified or unvitrified magnesia may be tumbled with the particles of naphthalene, or the combination may be obtained, where the magnesia is in damp or wet condition, in a pug or similar mixing mill where knives or crushing arrangements would tend to distribute the naphthalene particles throughout the plastic magnesia material so that such naphthalene particles would be coated, encompassed and encased in the plastic magnesia material. This mixing operation may take place for a few minutes or for several hours, depending upon the result that is to be obtained.

The final combination may then be subjected to extrusion, molding or other forming procedures which will have the effect of compressing the naphthalene particles and the plastic colloidized magnesia closely together to form a unitary mass, which may be ready for drying and/or firing or for further processing, as the case may be.

The formed rods, blocks or other masses of magnesia and the combustible or volatizable material are then subjected to a volatilization treatment, preferably after thorough drying, to cause removal of the naphthalene structure. This volatilization may be carried out by baking the masses or blocks of plastic magnesia and the volatilizable material, such as naphthalene, at a temperature which should preferably not exceed the melting point of the naphthalene.

By using pressures varying from atmospheric to say, for example, substantial vacuums, it is possible to control the character of the cellular structure and the temperature, and it has been found that very satisfactory products are obtained, for example, by baking the product at a temperature of about 75° C. to 85° C. for a period of three to ten hours under a pressure from one-half to three-quarters atmospheric.

With sawdust, coke and gums, higher volatilization temperatures should be employed. For example, temperatures of about 400° C. to 450° C. may be used with these materials.

It is undesirable at any time to have the naphthalene or other volatile material melt, since this might result in absorption by the cell walls of the naphthalene and imprisonment of the volatilizable material and a tendency to produce a non-preferred cellular structure.

After the formation and volatilization the resultant structure may then be fired at varying temperatures from 1200° C. to 1600° C., and preferably from 1350° C. to 1500° C.

The final refractory, amorphous, non-crystalline, cellular, vitric-like or vitreous, white-colored magnesia materials have a specific gravity of its solid portions of 3.4; a melting point substantially the same as pure magnesia; and a hardness of 6 to 7 Mohs. They may be utilized for stoneware, refractory bricks, battery caps, filter plates, translucent panels, furnace linings, muffles, tiles, non-slip treads, hearth plates, saggers, chemical stoneware, pottery, electric furnace cores, and so forth.

The ceramic materials produced according to the present invention usually break with a conchoidal fracture and do not have cleavage planes.

The cellular structure apparently takes up expansion and contraction with varying temperatures, with the result that the product produced will more readily withstand sudden, rapid or extreme changes in temperature.

Moreover, even though the product be subjected to varying temperatures and substantial mechanical stress, nevertheless, the cell walls appear to be quite strong and substantial and will prevent communication between cells even though the material be subjected to strenuous wear and tear over long periods of time. The cell walls may vary in thickness, depending upon the method of manufacture, from 0.001 to 0.010 inch, and more desirably from 0.003 to 0.006 inch, where the cells of the cellular structure occupies about 80% of the total volume. However, where the cells occupy a lesser volume of the total mass, the cell walls will be correspondingly thicker.

In the drawing, which shows diagrammatically one procedure according to the present invention, each figure represents a successive step in the operation.

Fig. 1 shows a ball or pebble mill 10 in which the dehydrated magnesia, with or without addition of 1% to 5% of a vitrifying catalyst such as silica, is ground for a period of say 12 to 96 hours, until the ground material tends to remain suspended in water and acquires a partly or completely hydrated and colloidal condition.

In Fig. 2 is shown a blunge 11 into which the slip or suspension of magnesia is emptied from the mill 10.

In Fig. 3 the suspension or slip from the blunge 11 is pumped through the filter press 13 to form the filter cakes 14. The filter pressure may be such as to leave an amount of water varying from 30% to 40%, and in the filter press there may be washing operations to decrease the amount of the soluble salts left in the magnesia.

In Fig. 4 the filter cakes 14 from the filter press 13 are dried in the oven 15. The filter cakes may be dried, for example, at a temperature of between 80° C. to 110° C., removing all the uncombined water. The filter cakes then may be crushed and ground and screened, if desired (as for example by a Beach-Russ separator), and the coarse particles may then be recrushed.

However, in the procedure shown in the attached drawing, in Fig. 5 the filter cakes 14, after being dried, with or without subdivision into small particles, are fired in a furnace or kiln 16 to a temperature of about 1500° C. This firing may be carried out in a reducing or oxidizing atmosphere for a period of three to six hours, and it will result in small vitreous pieces of magnesia being prepared which may then be reground.

If desired, the filter cakes, before firing, may be broken into a coarse powder, which may then be directly fired in the rotary calciner or in crucibles, or even in a furnace or kiln, such as 16. A rotary calciner, as illustratively shown in Fig. 5a, may be utilized in connection with the initial firing of the magnesia before combination with the volatilizable material or the naphthalene balls.

In Fig. 6 is shown a hammer mill 17 in which the vitrified magnesia may be broken up into a powder or dust. Instead of the hammer mill 17, there may also be utilized devices such as the Raymond pulverizer or Patterson tube mill.

In Fig. 7, the ground material from the hammer mill 17 of Fig. 6 is mixed with volatile or combustible particles and preferably spherical particles of naphthalene. Combustible materials such as charcoal or even wood particles are not generally preferred.

The proportions of naphthalene and magnesia may be varied from one to five parts of naphthalene to one to ten parts of magnesia, and in some instances the amount of naphthalene utilized may be greater than the amount of magnesia. This percentage may be varied, depending upon the number and volume of the cells desired in the completed article, and as a general rule the best cellular-content for fire bricks and furnace linings ranges from 50% to 60%, although with burners it is sufficient to obtain a cellular-content of 25%.

In Fig. 7 the mixing device may consist of a tumbling mill 18, or knives and other mixing devices may be provided. The mixture from the mixing device 18 of Fig. 7 is then pressed into an article 19 by the press 20, the article 19 for example consisting of a refractory brick. This pressure may take place in dry or dampened state, or a temporary binder may be included with the mixture of vitrified magnesia and volatile particles.

Although a press 20 is the preferred means of forming the articles, they may also be formed by pug mills, such, for example, as the type manufactured by the Ceramic Machine Company, or the type known as F-R-H vacuum pottery pug mill, manufactured by the Fate-Root-Heath Company of Plymouth, Ohio. In these pug mills pressure and vacuum may be applied to draw out the air from the mass so that the extruded substance is substantially devoid of air and gas bubbles. This will result in a more homogeneous magnesia ceramic.

The pug mill is preferably provided with knives to first cut up the magnesia material, following which the material is picked up by an auger or Archimedes screw which presses out the material through dies to form sheets or cylinders or tubes.

The pressed article 19 from Fig. 8 is then dried in the oven 21 of Fig. 9.

Where naphthalene particles are employed, they are first volatilized at about 75° C. and the vapors of naphthalene are led to a cooling chamber where they are condensed and the naphthalene is recovered. Where combustile particles are utilized they may be burned out in a firing kiln or furnace.

After baking the articles 19 in the oven 21 of Fig. 9, the articles or bricks 19 are then fired in the furnace 20 of Fig. 10 at a temperature of approximately 1500° C. The furnace 20 may consist either of a periodic or tunnel kiln. The firing operation may be carried out in an oxidizing atmosphere containing air, or in a reducing atmosphere containing substantial quantities of hydrogen and carbon monoxide or other reducing gases.

If desired, the final firing operation at 1450° C. to 1500° C. may be performed in a reducing atmosphere of combustion gas containing carbon monoxide formed in the kiln during firing or cooling, or preferably during both firing and cooling. Colored effects may also be obtained by incorporating iron, vanadium, chromium or manganese compounds in the magnesia before or after wet grinding, these compounds, preferably, however, being ground in at the same time as the vitrifying catalysts, but in amounts never exceeding a few percent.

Before the firing operation in Fig. 10 it is most important that the plastic material be substantially dehydrated, and the formed material may be pre-dried if desired.

Among the vitrifying catalysts which may be utilized with magnesia, the preferred vitrifying catalyst is 2 to 5% of silica, which is preferably collodized or ground to a fine state of suspension at the same time the magnesia is ground.

The resultant article is cellular and the walls of the cells are dense, non-porous, homogeneous, and vitreous. The commercial advantages of these cellular, vitreous, refractory articles lie in the fact that less weight of raw material is used in their manufacture, resulting in lower manufacturing cost of the articles. Shipping costs are lower due to the lightness of the article. The articles will stand great changes in temperature without cracking due to their cellularity, and can be easily cut and shaped to conform to building conditions. The cellular articles are good heat insulators; for example, they may be used directly in contact with the fire and also as backing bricks. The articles have an extremely high melting point; in fact, small diameter rods withstand the high temperatures of the oxy-hydrogen flame for long periods of time without melting or disintegration. The articles are chemically stable and are inert to water and atmospheric conditions and will not combine with water or carbon dioxide gas to form hydrates or carbonates.

Instead of forming objects such as bricks directly by the firing operation, it is also possible to break the ceramic objects formed into grains which may be sorted in accordance with their dimensions. These grains may then be combined in the form of an article such as a brick or tread by bonding materials such as fluxing clays, synthetic resins, rubber, sodium silicate and so forth.

The vitreous magnesia material has the same melting point as pure magnesia, namely, about 2800° C.

Where alumina is used as the base of the product instead of magnesia, it may be subjected to the same processing as above, and preferably small amounts of magnesia and silica are used as a vitrifying catalyst, say for example, 1% to 5% of silica and 1% to 5% of magnesia, with an optimum of 2% to 3% of each material.

Generally the alumina is prepared in relatively anhydrous, amorphous condition from bauxite by grinding or crushing the bauxite, dissolving it in a caustic alkali, followed by precipitation of the aluminum hydroxide and dehydration at a temperature below 1000° C., and preferably at a temperature of 500° C. to 600° C. Then the dehydrated alumina may be ground with 2% of silica and 3% of magnesia, filtered, and the damp mass may be fired at a temperature of from 1250° C. to 1500° C. to produce a ceramic having a melting point of 2050° C.

The amount of grinding and the method of forming the cellular material is the same as has already been described in connection with the magnesia.

Where bauxite is employed, the bauxite may be wet ground and then processed as above without purification and without addition of vitrifying catalysts, or there may be added small percentages up to 5% of the same vitrifying catalysts as described above for addition to the magnesia, or catalysts such as the alkali metal or alkaline earth metal salts or hydroxides, and such as the nitrates, borates, sulphates, carbonates, and so forth. The final cellular brick will have a melting point of about 1950° C. to 2000° C. The firing temperature is between 1200° C. and 1350° C., or preferably about 1300° C., which temperature is maintained for from nine to twelve hours.

The cellular alumina or bauxite formed is hard and dense, being harder and denser than the magnesia, and in general the vitreous alumina or bauxite will have a specific gravity of about 3.6 to 3.7 for its solid portion and a hardness of 70 to 76 C or more preferably 74 to 76 C on the Rockwell scale, or about 9 Mohs. Upon firing of the bauxite it is also possible to control the atmosphere so as to control the color which will be given to the final ceramic by the iron oxide present therein.

In all cases where vitrifying catalysts are employed they should be of such a nature, or the firing should be conducted at such a temperature as not to result in fluxing or fusion of said catalysts, and moreover, the catalysts should also be dispersed in substantially colloidal form throughout the mass of the material being vitrified by the firing procedure at temperatures between 1000° C. and 1600° C.

Although bauxite may be vitrified without the addition of vitrification catalysts, in connection with alumina and magnesia, vitrifying catalysts of the character above described are preferably employed. With magnesia it is generally sufficient merely to use the acid oxide as a catalyst, while with alumina it is generally preferable to use both acid and basic oxides, the oxides in all cases preferably being used in amounts of less than 5% to 10%.

Instead of wet grinding in a ball or pebble mill, as above described, it is also possible to use other methods of dividing, such as by forcing the ceramic material mixed with water through a nozzle at a high pressure against a hard surface; by grinding wet in a pin mill; by the use of colloid mills; by jet pulverization; or by a combination of dry pulverizing or grinding in a micronizer impact mill with collection of the air-floated particles.

By the expression "amorphous" utilized throughout the specification and claims is meant that the material is devoid of any substantial amount of crystals or crystalline structure.

The present application differentiates from copending application Serial No. 131,126, filed March 16, 1937, now U. S. Patent 2,347,658, and Serial No. 135,369, filed April 7, 1937, now U. S. Patent 2,278,442, in being specifically limited to forming cellular ceramics in which a cell-forming compound is incorporated in the amorphous dehydrated magnesia, alumina or bauxite after such material has been wet ground to substantially less than 50 to 60 microns, with an average particle size of 10 to 30 microns.

It is apparent that many changes could be effected in the processes and procedures above described, and in the specific details thereof, without substantially departing from the invention intended to be defined in the claims, the specific description herein merely serving to illustrate certain compositions by which, in one embodiment, the spirit of the invention may be effectuated.

What I claim is:

1. A method of making refractory, vitreous, non-porous, lightweight, cellular ceramics, which comprises providing an amorphous low temperature-dehydrated ceramic material, finely grinding the same to an average fineness of less than 50 microns, mixing the ground material with a cell-forming compound, heating at sub-atmospheric pressures at a temperature to remove the cell-forming compound, and then firing at a temperature of about 1200° C. to 1600° C.

2. A method of making refractory, vitreous, non-porous, lightweight, cellular magnesia ceramics, which comprises providing an amorphous low temperature-dehydrated amorphous magnesia, finely grinding the same in water to an average fineness of less than 50 microns, mixing the ground material with a volatilizable organic compound, baking at sub-atmospheric pressures to remove the compound, and then firing at a temperature of about 1500° C.

3. A method of making refractory, vitreous, non-porous, lightweight, cellular alumina ceramics, which comprises providing an amorphous dehydrated alumina, finely grinding the same in the wet to an average fineness of about 12 to 20 microns, mixing the ground material with naphthalene, heating at sub-atmospheric pressures at a temperature to remove the naphthalene, and then firing at a temperature of about 1250° C.

4. A method of making refractory, vitreous, non-porous, lightweight, cellular bauxite ceramics, which comprises providing an amorphous, dehydrated bauxite, finely grinding the same in the wet to a fineness of less than about 50 microns, mixing the ground material with balls of naphthalene, baking at sub-atmospheric pressures to remove the naphthalene, and then firing at a temperature of about 1500° C.

5. A method of making refractory, vitreous, non-porous, lightweight, cellular ceramics, which comprises providing an amorphous low temperature-dehydrated ceramic material, mixing it with a vitrifying catalyst, wet grinding the material with a cell-forming compound, heating at sub-atmospheric pressures at a temperature to remove the cell-forming compound, and then firing at a temperature of about 1200° C. to 1600° C.

6. A method of making refractory, vitreous, non-porous, lightweight, cellular ceramics, which comprises providing an amorphous low temperature-dehydrated ceramic material, finely grinding the same in the wet to a fineness of less than 50 microns, mixing the ground material with naphthalene, volatilizing the naphthalene while maintaining sub-atmospheric pressures, and then firing at a temperature of about 1200° C. to 1600° C.

7. A process of forming cellular, vitreous, non-porous, hard ceramics which comprises first dry and then wet grinding a ceramic oxide, selected from the group consisting of magnesia and alumina, with a small amount of an acid oxide, continuing the grinding until the majority of the particles of the ceramic have been reduced to a size of less than 50 microns, thoroughly mixing and compressing with a cell-forming material, baking at a pressure less than three-quarters of one atmosphere and then firing.

8. A process of making non-porous, magnesia ceramics which comprises wet grinding amorphous magnesia together with from 1% to 5% of silica until the average particle size is about 10 to 30 microns, filtering, drying the filter cakes, grinding the dried filter cakes, mixing with from 25% to 85% by volume of naphthalene in spheroidal form, forming under pressure, baking at sub-atmospheric pressures at about 60° C. to 100° C. and then firing at about 1000° C. to 1600° C.

9. A process of making cellular, vitreous, non-porous, hard ceramics from alumina which comprises preparing a dehydrated alumina free of iron and titanium oxides, wet grinding until the average particle size has been reduced to substantially less than about 50 microns, combining with a volatilizable organic compound, forming under compression, baking at sub-atmospheric pressures to volatilize the organic compound and then firing at about 1200° C. to 1500° C.

10. A process of preparing cellular, non-porous, alumina ceramics which comprises dehydrating precipitated aluminum hydroxide at a temperature from about 500° C. to 800° C., mixing the dehydrated material with between about 1% to 10% of magnesia and silica, wet grinding until a particle size of less than about 60 microns has been attained, filtering, drying the filter cakes, grinding the dried filter cakes, combining the ground material with naphthalene balls, forming under compression, baking at sub-atmospheric pressures and then firing.

11. A process of preparing cellular, non-porous, aluminous ceramics which comprises dehydrating a hydrous, alumina material, wet grinding until a major portion of the material has acquired a particle size of less than 50 microns, combining the ground material with a volatilizable material, forming the material, baking at sub-atmospheric pressures to remove the volatilizable material and then firing.

12. A process of preparing cellular, non-porous, ceramics from a material selected from the group consisting of precipitated aluminum hydroxide, bauxite and magnesite, which comprises driving off volatiles from these materials by heating, wet grinding until a major portion of these materials attains a particle size of less than 50 microns, combining the ground material with a readily volatilizable solid material, heating at sub-atmospheric pressures to a relatively low temperature to drive off the volatilizable material and then firing at a relatively high temperature to vitrify said first mentioned materials.

13. A process of forming cellular, non-porous, aluminous ceramics which comprises dehydrating bauxite at a reduced temperature, mixing the dehydrated bauxite with from between 1% to 5% of silica and wet grinding until 50% to 80% of the dehydrated bauxite has a size smaller than 50 microns, filter pressing, drying the filter cakes at a relatively low temperature, grinding the filter cakes, combining the ground filter cakes with a volatilizable solid organic material, forming under compression, baking at sub-atmospheric pressures and then firing to form a vitreous, cellular, bauxite ceramic.

JOHN ALLEN HEANY.